Jan. 24, 1928.

A. AGRONOFSKY 1,657,188

CONDENSER

Filed Jan. 31, 1927   2 Sheets-Sheet 1

INVENTOR
Abraham Agronofsky
BY
Albert E Dutwich
ATTORNEY

Jan. 24, 1928.

A. AGRONOFSKY

CONDENSER

Filed Jan. 31, 1927

INVENTOR
Abraham Agronofsky.
BY
ATTORNEY

Patented Jan. 24, 1928.

1,657,188

UNITED STATES PATENT OFFICE.

ABRAHAM AGRONOFSKY, OF ST. JOSEPH, MISSOURI.

CONDENSER.

Application filed January 31, 1927. Serial No. 164,809.

The invention generally relates to variable condensers and has for its object to provide a simple and efficient condenser structure comprising spaced stator plates and a plurality of spaced plate rotor units connected together to move in unison and mounted in such manner whereby each unit is permitted to move through almost a complete circle, the mounting shaft of each constituting a limiting stop for the other.

With the above and other objects in view that will hereinafter appear, the invention further resides in the novel details of construction, combination and arrangement of parts, all of which will be first fully described, then be particularly pointed out in the appended claims, reference being had to the accompanying drawings, in which:—

Figure 1:
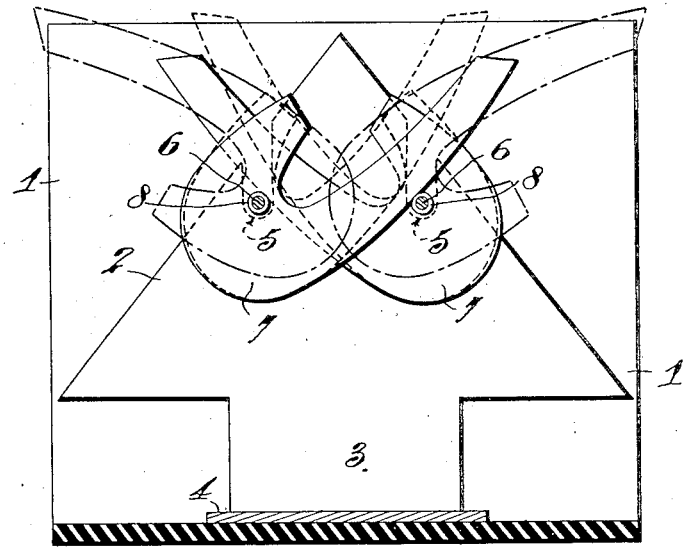
Figures 1 and 2 are cross sectional views illustrating the upper and lower extreme or stop positions of the rotor units, each figure also showing intermediate positions in dot, and dot and dash line.
Figure 2:
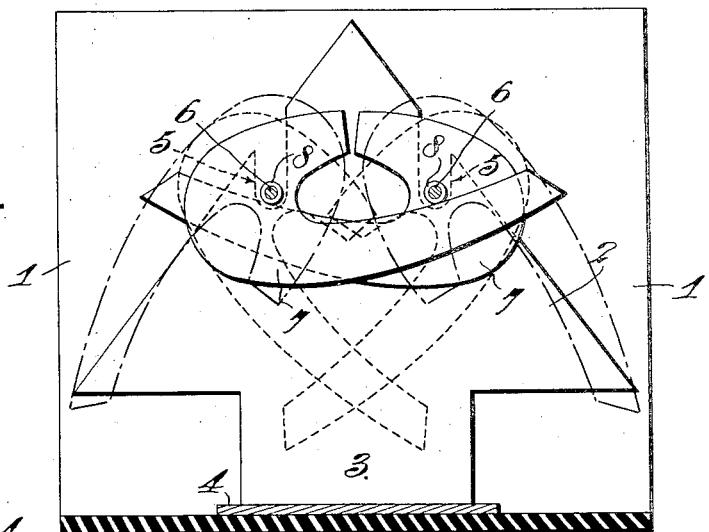
Figure 3:
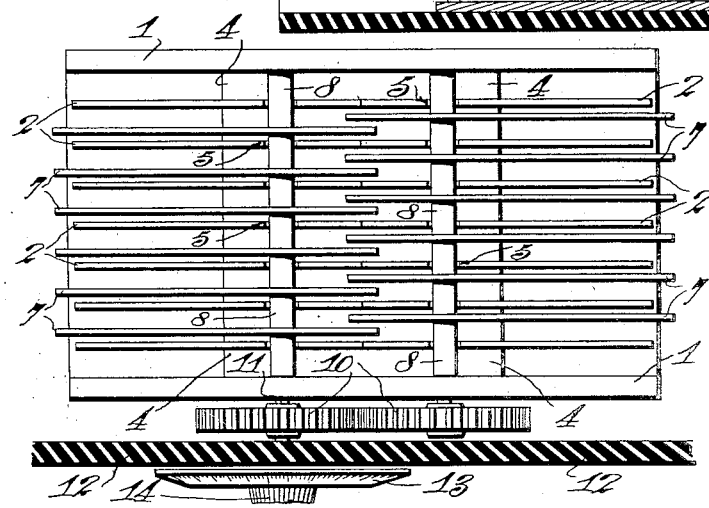
Figure 3 is a plan view of the condenser.
Figure 4:
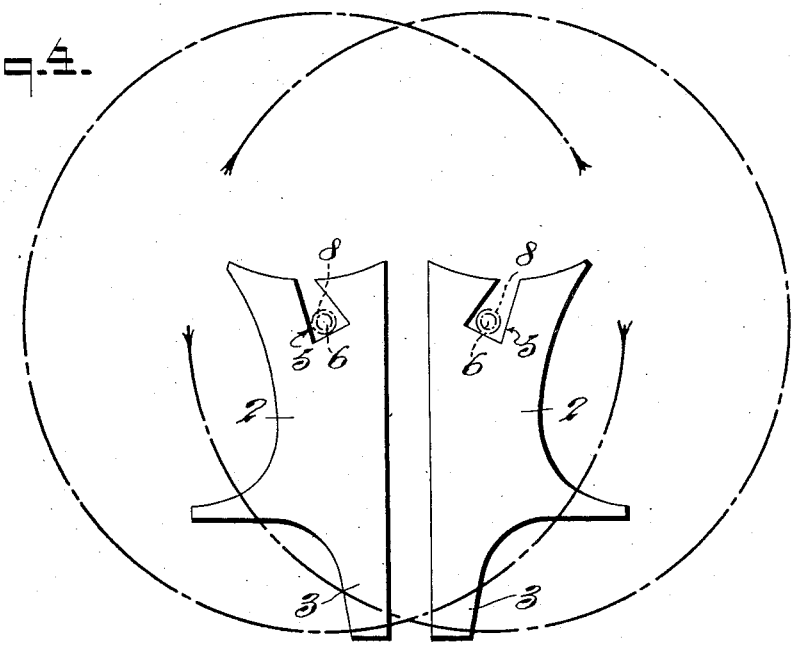
Figures 4 and 5 are face views each showing a modified form of stator plate which may be employed if desired, the path of travel of the rotor unit tips being illustrated in dot and dash lines in each instance.
Figure 5:
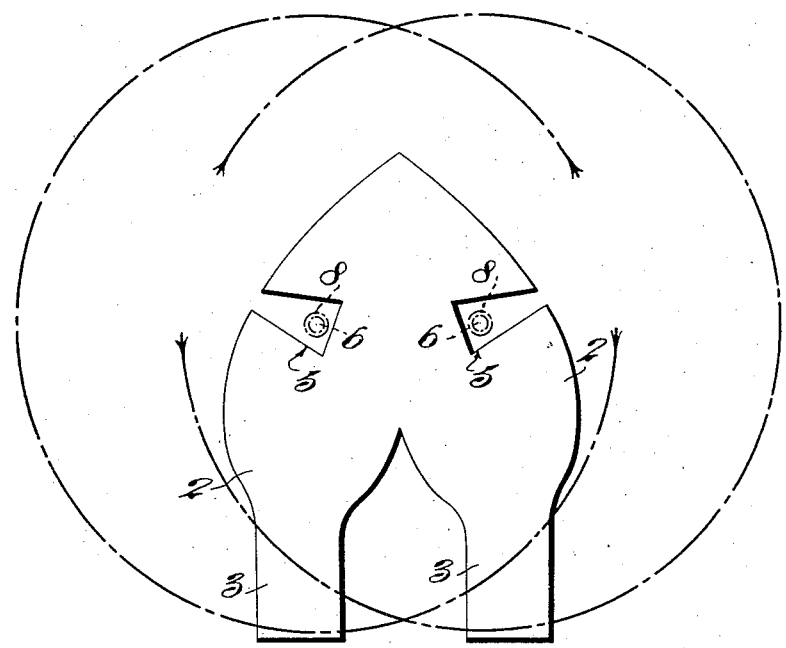

In the drawings 1 represents any suitable framing in which the rotor and stator units may be mounted. The stator plates 2 have downward extensions 3 by which they are mounted in the frame in suitable spaced relation as at 4. In Figures 1-3 the stator plates are shown of substantially arrow-head shape, it being understood, of course, that other shapes of stator plates may be employed if desired, such, for example, as are illustrated in Figures 4 and 5 of the drawings.

The stator plates are provided with registering recesses 5 at each side of the center thereof to accommodate free passage of or for surrounding the individual rotor shafts 6 which pass through the said recesses transversely and have suitable rotatable bearing in the frame sides.

Rotor plates 7 are secured upon the shafts 6 in spaced relation, the plates being in conductive contact with the shafts but spaced apart by insulating sleeves 8. The spacing of the rotor and stator plates is clearly illustrated in Figure 3 of the drawings.

By reason of mounting the rotor and stator plates corelatively, as illustrated in Figures 1 and 2, it is possible to move the rotor units through approximately a complete revolution, the rotor shafts 6 alone serving to limit such movement. Thus it will be seen that a very great range of capacity varying movement is provided for, and each shaft 6 and its spacers 8 serves as a limiting abutment for the opposite rotor unit.

The rotor units may, of course, be connected to operate individually, if desired, but I prefer to connect them to operate in unison. When connected as last stated the shafts 6 are equipped with like sized meshing gears 10 and one of the shafts is extended as at 11 to project through the panel 12 where it is equipped with the usual dial 13 and turning knob 14 through the medium of which the rotor units may be moved.

From the foregoing description, taken in connection with the accompanying drawings, it is thought the novel details of construction, the manner of use and the advantages of the invention will be readily apparent to those skilled in the art to which it relates.

What I claim is:

1. A variable condenser comprising a plurality of stator plates, a plurality of spaced plate rotor units, a movable shaft for mounting each rotor unit and constituting a limiting stop for the adjacent rotor unit.

2. A variable condenser comprising a plurality of stator plates, a plurality of spaced plate rotor units, a rotatable shaft for rotatably mounting each rotor unit, said rotor unit shafts being so mounted corelatively to each other and the respective rotor units that each constitutes a stop limiting rotation of the opposite rotor unit in either direction.

3. A variable condenser comprising a frame; a plurality of stator plates; a plurality of spaced rotor units each comprising a plurality of spaced plates, a cross shaft rotatably mounted in the frame, and spacers for separating said plates; said stator plates having extensions for securing them to the frame in spaced relation and at points beyond the rotative path of travel of the rotor units; and said cross shafts being so corelatively spaced that each constitutes a rotation limiting stop for the opposite unit.

ABRAHAM AGRONOFSKY.